United States Patent
Ishikawa et al.

(10) Patent No.: US 12,095,073 B2
(45) Date of Patent: Sep. 17, 2024

(54) NEGATIVE ELECTRODE FOR NONAQUEOUS ELECTROLYTE SECONDARY BATTERY AND NONAQUEOUS ELECTROLYTE SECONDARY BATTERY

(71) Applicant: Panasonic Intellectual Property Management Co., Ltd., Osaka (JP)

(72) Inventors: Kaori Ishikawa, Hyogo (JP); Daisuke Ito, Hyogo (JP); Yuta Matsuo, Hyogo (JP); Mamoru Kuramoto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 607 days.

(21) Appl. No.: 17/414,650

(22) PCT Filed: Nov. 27, 2019

(86) PCT No.: PCT/JP2019/046295
§ 371 (c)(1),
(2) Date: Jun. 16, 2021

(87) PCT Pub. No.: WO2020/137321
PCT Pub. Date: Jul. 2, 2020

(65) Prior Publication Data
US 2022/0052314 A1 Feb. 17, 2022

(30) Foreign Application Priority Data
Dec. 28, 2018 (JP) ................................. 2018-248141

(51) Int. Cl.
*H01M 4/133* (2010.01)
*H01M 4/02* (2006.01)
(Continued)

(52) U.S. Cl.
CPC ........... *H01M 4/133* (2013.01); *H01M 4/134* (2013.01); *H01M 4/386* (2013.01); *H01M 4/587* (2013.01);
(Continued)

(58) Field of Classification Search
None
See application file for complete search history.

(56) References Cited

U.S. PATENT DOCUMENTS

2017/0062818 A1* 3/2017 Ogata ................... H01M 4/525
2017/0200976 A1* 7/2017 Nakazawa ............ H01M 4/505
(Continued)

FOREIGN PATENT DOCUMENTS

JP 2010-33998 A 2/2010
JP 2012-003997 A 1/2012
(Continued)

OTHER PUBLICATIONS

KR 10-2015-0049999 A English machine translation (Year: 2015).*
English translation of International Search Report dated Feb. 10, 2020, issued in counterpart Application No. PCT/JP2019/046295. (3 pages).
(Continued)

*Primary Examiner* — Scott J. Chmielecki
(74) *Attorney, Agent, or Firm* — WHDA, LLP

(57) ABSTRACT

A negative electrode having a negative electrode collector; and a negative-electrode mixed material layer that is formed atop the negative electrode collector. The negative-electrode mixed material layer includes: a first layer which contains a first carbon-based active material, a silicon-based active material, a polyacrylic acid, or a salt thereof, the first layer being formed atop the negative electrode collector; and a second layer having a tap density greater than that of the first carbon-based active material and a BET specific surface area smaller than that of the first carbon-based active material. The mass of the first layer is at least 50 mass % but less than (Continued)

90 mass % with respect to the mass of the negative-electrode mixed material layer, and the mass of the second layer is greater than 10 mass % but no more than 50 mass % with respect to the mass of the negative-electrode mixed material layer.

5 Claims, 2 Drawing Sheets

(51) Int. Cl.
  *H01M 4/134* (2010.01)
  *H01M 4/38* (2006.01)
  *H01M 4/587* (2010.01)
  *H01M 4/62* (2006.01)
(52) U.S. Cl.
  CPC ...... *H01M 4/622* (2013.01); *H01M 2004/021* (2013.01); *H01M 2004/027* (2013.01)

(56) References Cited

U.S. PATENT DOCUMENTS

| | | | |
|---|---|---|---|
| 2018/0062158 A1* | 3/2018 | Kim | H01M 4/364 |
| 2018/0358610 A1 | 12/2018 | Shimanuki et al. | |
| 2021/0104750 A1* | 4/2021 | Ito | H01M 4/663 |
| 2021/0202931 A1* | 7/2021 | Lee | H01M 4/587 |
| 2023/0387387 A1* | 11/2023 | Sano | H01M 4/1393 |

FOREIGN PATENT DOCUMENTS

| | | | | |
|---|---|---|---|---|
| JP | 2015-146272 A | | 8/2015 | |
| JP | 2016-009651 A | | 1/2016 | |
| KR | 10-2015-0049999 A | * | 5/2015 | ............. H01M 4/13 |
| WO | 2017/094712 A1 | | 6/2017 | |
| WO | 2018/179817 A1 | | 10/2018 | |

* cited by examiner

NEGATIVE ELECTRODE FOR NONAQUEOUS ELECTROLYTE SECONDARY BATTERY AND NONAQUEOUS ELECTROLYTE SECONDARY BATTERY

TECHNICAL FIELD

The present disclosure relates to a negative electrode for a non-aqueous electrolyte secondary battery, and a non-aqueous electrolyte secondary battery.

BACKGROUND ART

It is known that a Si-based active material can intercalate a larger amount of lithium ions per unit volume than a carbon-based active material such as graphite. For example, PATENT LITERATURE 1 discloses a negative electrode for a non-aqueous electrolyte secondary battery, comprising a negative electrode mixture layer containing a Si-based active material and graphite each as a negative electrode active material. On the negative electrode disclosed in PATENT LITERATURE 1, a carbon-containing layer containing carbon and a binder is formed on the surface of the negative electrode mixture layer on the side facing a positive electrode, the carbon-containing layer having a thickness of 10% or less of the thickness of the negative electrode mixture layer.

CITATION LIST

Patent Literature

PATENT LITERATURE 1: Japanese Unexamined Patent Application Publication No. 2012-3997

SUMMARY

In the negative electrode including a Si-based active material, deterioration in charging/discharging cycle characteristics is liable to cause a problem. It can be considered that the main cause of this is in that the extent of contact between particles of the negative electrode active material is weakened, or the contact state is lost by a large change in the volume of the Si-based active material accompanying charging and discharging, so that negative electrode active material particles which are isolated from conductive paths in the negative electrode mixture layer increase. To suppress such isolation of the negative electrode active material (Si-based active material), measures such as an increase in the amount of the binder and addition of a conductive agent are conceivable, but in these cases, for example, deterioration in input characteristics of a battery, or deterioration in high-temperature storage characteristics of a battery may occur in some cases.

It is an advantage of the present disclosure to provide a negative electrode for a non-aqueous electrolyte secondary battery, the negative electrode including a Si-based active material and being such that the input characteristics, cyclic characteristics, and high-temperature storage characteristics of a non-aqueous electrolyte secondary battery may be improved.

The negative electrode for a non-aqueous electrolyte secondary battery that is one aspect of the present disclosure comprises: a negative electrode current collector; and a negative electrode mixture layer formed on the negative electrode current collector, wherein the negative electrode mixture layer has: a first layer formed on the negative electrode current collector, the first layer including a first carbon-based active material, a Si-based active material, and polyacrylic acid or a salt thereof; and a second layer formed on the first layer, the second layer including a second carbon-based active material having a higher tap density than the first carbon-based active material and a lower BET specific surface area than the first carbon-based active material, and the mass of the first layer is 50% by mass or more and less than 90% by mass based on the mass of the negative electrode mixture layer, and the mass of the second layer is more than 10% by mass and 50% by mass or less based on the mass of the negative electrode mixture layer.

A non-aqueous electrolyte secondary battery that is one aspect of the present disclosure comprises: the negative electrode for a non-aqueous electrolyte secondary battery; a positive electrode; and a non-aqueous electrolyte.

According to the negative electrode for a non-aqueous electrolyte secondary battery of the present disclosure, input characteristics, cyclic characteristics, and high-temperature storage characteristics of a non-aqueous electrolyte secondary battery may be improved.

DESCRIPTION OF EMBODIMENTS

Figure 1:
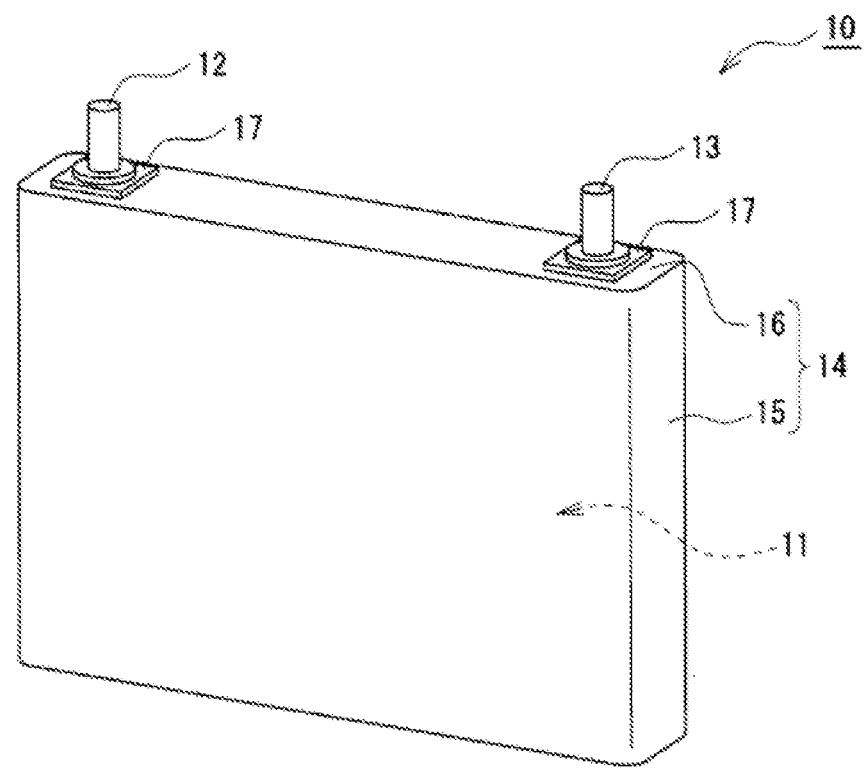
FIG. 1 is a perspective view showing a non-aqueous electrolyte secondary battery as one exemplary embodiment.

The negative electrode for a non-aqueous electrolyte secondary battery that is one aspect of the present disclosure comprises: a negative electrode current collector; and a negative electrode mixture layer formed on the negative electrode current collector, wherein the negative electrode mixture layer has: a first layer formed on the negative electrode current collector, the first layer including a first carbon-based active material, a Si-based active material, and polyacrylic acid or a salt thereof; and a second layer formed on the first layer, the second layer including a second carbon-based active material having a higher tap density than the first carbon-based active material and a lower BET specific surface area than the first carbon-based active material, and the mass of the first layer is 50% by mass or more and less than 90% by mass based on the mass of the negative electrode mixture layer, and the mass of the second layer is more than 10% by mass and 50% by mass or less based on the mass of the negative electrode mixture layer.

Here, the smaller the BET specific surface area of a carbon-based active material, the more reaction with a non-aqueous electrolyte is suppressed during, for example, charge and discharge, or high-temperature storage, and therefore the more the carbon-based active material contributes to improvements in cyclic characteristics of a battery and deterioration in capacity after high-temperature storage (that is, a high-temperature storage characteristic). However, the reaction with a non-aqueous electrolyte is likely to occur to an active material present on the surface side of the negative electrode mixture layer. Accordingly, it is considered that by using, as a carbon-based active material for the second layer to be on the surface side in the negative electrode mixture layer formed on the negative electrode current collector, the second carbon-based active material having a lower BET specific surface area than the first carbon-based active material for the first layer to be on the current collector side, like the negative electrode for a non-aqueous electrolyte secondary battery that is one aspect of the present disclosure, the cyclic characteristics and the storage characteristics are improved. Moreover, the smaller the BET specific surface area of the carbon-based active material, the more the lithium ion-receiving property is deteriorated, and therefore there is concern over deterioration in the input characteristics of a battery. However, it is considered that by using, as a carbon-based active material for the second layer to be on the surface side in the negative electrode mixture layer formed on the negative electrode current collector, the second carbon-based active material having a higher tap density than the first carbon-based active material for the first layer to be on the current collector side, like the negative electrode for a non-aqueous electrolyte secondary battery that is one aspect of the present disclosure, inter-particle diffusion paths for lithium ions in the negative electrode are easily retained, and therefore the input characteristics are improved. Further, according to the negative electrode for a non-aqueous electrolyte secondary battery that is one aspect of the present disclosure, the presence of polyacrylic acid or the salt thereof included in the first layer binds particles of the negative electrode active materials (the Si-based active material and the first carbon-based active material) strongly and therefore an increase in the negative electrode active material particles which are isolated from the conductive paths in the first layer is suppressed, so that deterioration in the charge and discharge cycle characteristics of a non-aqueous electrolyte secondary battery is suppressed even when a large change in volume occurs to the Si-based active material accompanying charge and discharge. However, to achieve all of the input characteristics, the cyclic characteristics, and the high-temperature storage characteristics of a battery in a well-balanced manner, setting the mass % of the first layer and of the second layer based on the mass of the negative electrode mixture layer to the predetermined ranges is also necessary.

Hereinafter, embodiments of a negative electrode for a non-aqueous electrolyte secondary battery and a non-aqueous electrolyte secondary battery of the present disclosure will be described in detail with reference to the drawings.

FIG. 1 is a perspective view showing a non-aqueous electrolyte secondary battery as one exemplary embodiment. The non-aqueous electrolyte secondary battery 10 shown in FIG. 1 as an example is a rectangular-shaped battery, but the non-aqueous electrolyte secondary battery of the present disclosure is not limited to this, and may be a cylindrically shaped battery comprising a cylindrically shaped battery case, a laminate battery comprising an exterior body formed of a laminate film including a metal layer, or the like. The expression "numerical value (1) to numerical value (2)" as used herein means numerical value (1) or more and numerical value (2) or less.

As shown in FIG. 1 as an example, the non-aqueous electrolyte secondary battery 10 comprises: an electrode assembly 11; a non-aqueous electrolyte; and a rectangular-shaped battery case 14 that houses these. The electrode assembly 11 has a positive electrode, a negative electrode, and a separator. The electrode assembly 11 is a lamination type electrode assembly in which positive electrodes and negative electrodes are alternately laminated one by one with separators interposed therebetween. The electrode assembly is not limited to this, and may be a wound type electrode assembly in which a long positive electrode and a long negative electrode are wound together with a separator interposed therebetween.

The battery case 14 has: a case body 15 having an approximately box shape; a sealing assembly 16 that closes an opening of the case body 15; a positive electrode terminal 12 electrically connected to the positive electrode; and a negative electrode terminal 13 electrically connected to the negative electrode. The case body 15 and the sealing assembly 16 are formed of, for example, a metal material containing aluminum as a main component. The positive electrode terminal 12 and the negative electrode terminal 13 are fixed to the sealing assembly 16 through an insulating member 17. The sealing assembly 16 is generally provided with a gas discharge mechanism (not shown).

Hereinafter, the positive electrode, the negative electrode, the separator, and the non-aqueous electrolyte included in the non-aqueous electrolyte secondary battery 10, particularly negative electrode, will be described in detail.

[Positive Electrode]

The positive electrode comprises: a positive electrode current collector; and a positive electrode mixture layer formed on the positive electrode current collector. Foil of a metal, such as aluminum or an aluminum alloy, that is stable in the electric potential range of the positive electrode, a film with such a metal disposed on an outer layer, and the like can be used for the positive electrode current collector. The positive electrode mixture layer includes, for example, a positive electrode active material, a binder, and a conductive agent. The positive electrode mixture layer is preferably formed on each side of the positive electrode current collector. The positive electrode can be produced by, for example, applying a positive electrode mixture slurry including the positive electrode active material, the binder, the conductive agent, and the like on the positive electrode current collector, and drying and rolling the resultant coating film, thereby forming the positive electrode mixture layer on each side of the positive electrode current collector.

The positive electrode active material contains a lithium-containing metal composite oxide as a main component. Examples of the metal element contained in the lithium-containing metal composite oxide include Ni, Co, Mn, Al, B, Mg, Ti, V, Cr, Fe, Cu, Zn, Ga, Sr, Zr, Nb, In, Sn, Ta, W, Ca, Sb, Pb, Bi, and Ge. One example of suitable lithium-containing metal composite oxides is a composite oxide containing at least one of Ni, Co, Mn, and Al.

Examples of the conductive agent included in the positive electrode mixture layer include carbon materials such as carbon black, acetylene black, Ketjenblack, and graphite. Examples of the binder included in the positive electrode mixture layer include fluororesins such as polytetrafluoroethylene (PTFE) and polyvinylidene fluoride (PVDF), polyacrylonitrile (PAN), polyimides, acrylic resins, and polyolefins. These resins may be combined with carboxymethyl cellulose (CMC) or a salt thereof, polyethylene oxide (PEO), or the like.

[Negative Electrode]

Figure 2:
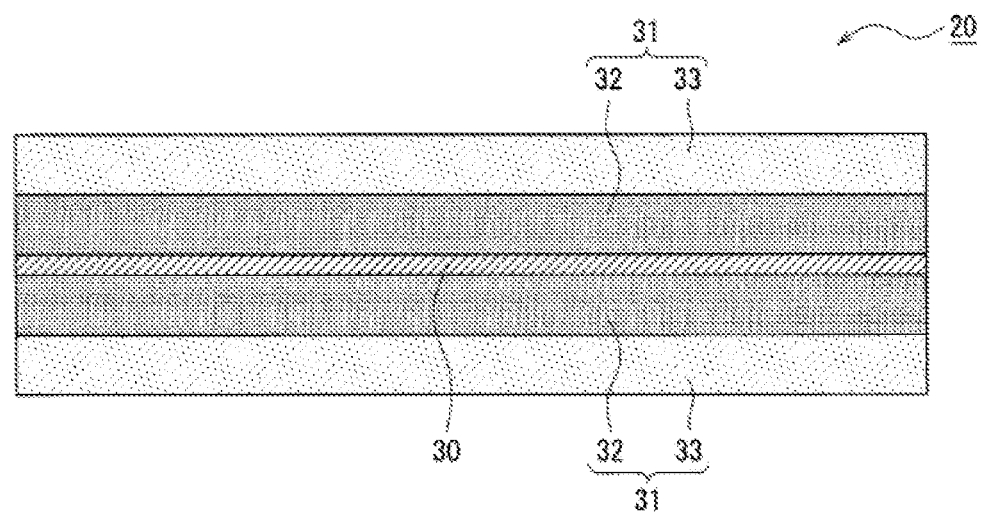
FIG. 2 is a sectional view of a negative electrode as one exemplary embodiment.

FIG. 2 is a sectional view of a negative electrode as one exemplary embodiment. As shown in FIG. 2 as an example, the negative electrode 20 comprises: a negative electrode current collector 30; and a negative electrode mixture layer 31 formed on the negative electrode current collector 30. For example, foil of a metal, such as copper or a copper alloy, that is stable in the electric potential range of the negative electrode, a film with such a metal disposed on an outer layer, and the like can be used for the negative electrode current collector 30. The negative electrode mixture layer 31 is preferably formed on each side of the negative electrode current collector 30. The negative electrode 20 can be produced by, for example, applying a negative electrode mixture slurry including the negative electrode active material, the binder, and the like on the negative electrode current collector 30, and drying and rolling the resultant coating film, thereby forming the negative electrode mixture layer 31 on each side of the negative electrode current collector 30.

The negative electrode mixture layer 31 has a first layer 32 formed on the negative electrode current collector 30 and a second layer 33 formed on the first layer 32. The first layer 32 is a layer (lower layer) including a first carbon-based active material, a Si-based active material, and polyacrylic acid or a salt thereof. The second layer 33 is a layer (upper layer) including a second carbon-based active material. The Si-based active material may be included in the second layer 33, but from the viewpoint of an improvement in the input characteristics of a battery, and the like, the second layer 33 preferably has a lower content rate of the Si-based active material than the first layer 32, and, more preferably, the second layer 33 includes only the carbon-based active material as a negative electrode active material and is substantially free of the Si-based active material (for example, less than 0.1% by mass based on the mass of the second layer 33).

The mass of the first layer 32 is 50% by mass or more and less than 90% by mass, and preferably 50% by mass to 70% by mass based on the mass of the negative electrode mixture layer 31 in terms of improving the input characteristics, the cyclic characteristics, and the high-temperature storage characteristics of a battery, and the like. The mass of the second layer 33 is more than 10% by mass and 50% by mass or less, and preferably 30% by mass to 50% by mass based on the mass of the negative electrode mixture layer 31 in terms of improving the input characteristics, the cyclic characteristics, and the high-temperature storage characteristics of a battery, and the like. In short, the mass ratio of the first layer 32 to the second layer 33 (the second layer 33/the first layer 32) is more than 0.1 and 0.5 or less, and preferably 0.3 to 0.5.

The filling density of the negative electrode mixture layer 31 is preferably 1.60 g/cm$^3$ or more in terms of improving the battery capacity, and the like. The filling density of the negative electrode mixture layer 31 is, for example, 1.60 g cm$^3$ to 1.70 g/cm$^3$. The filling densities of the first layer 32 and the second layer 33 may be the same with or different from each other. The filling density of the second layer 33 is preferably, for example, lower than the filling density of the first layer 32. One example of the filling density of the second layer 33 is 1.40 g/cm$^3$ to 1.55 g/cm$^3$. One example of the filling density of the first layer 32 is 1.65 g/cm$^3$ to 1.90 g/cm$^3$.

The thickness of the negative electrode mixture layer 31 is, for example, 30 μm-100 μm, or 50 μm-80 μm on the one side of the negative electrode current collector 30. The thicknesses of the first layer 32 and the second layer 33 may be the same with or different from each other as long as the mass ratio is satisfied. The thickness of the first layer 32 may be larger or smaller than the thickness of the second layer 33. A layer other than the first layer 32 and the second layer 33 may be included in the negative electrode mixture layer 31 within a range where the advantage of the present disclosure is not impaired.

The tap density of the second carbon-based active material included in the second layer 33 may be higher than the tap density of the first carbon-based active material included in the first layer 32 in terms of improving the input characteristics, the cyclic characteristics, and the high-temperature storage characteristics of a battery, and the like, but preferably, the first carbon-based active material has a tap density of 0.85 g/cm$^3$ to 1.00 g/cm$^3$ and the second carbon-based active material has a tap density of 1.0 g/cm$^3$ or higher, and more preferably, the first carbon-based active material has a tap density of 0.89 g % cm$^3$ to 0.95 g/cm$^3$ and the second carbon-based active material has a tap density of 1.0 g/cm$^3$ to 1.25 g/cm$^3$. The tap density of the carbon-based active materials is measured according to the method specified in JIS Z-2504. In the present specification, the bulk density measured after tapping a sample powder collected in a container 250 times is defined as the tap density.

The BET specific surface area of the second carbon-based active material included in the second layer 33 may be lower than the BET specific surface area of the first carbon-based active material included in the first layer 32 in terms of improving the input characteristics, the cyclic characteristics, and the high-temperature storage characteristics of a battery, and the like, but preferably, the first carbon-based active material has a BET specific surface area of 3.0 m$^2$/g to 8.0 m$^2$/g and the second carbon-based active material has a BET specific surface area of 0.9 m$^2$/g to 4.0 m$^2$/g, and more preferably, the first carbon-based active material has a BET specific surface area of 3.5 m$^2$/g to 6.5 m$^2$/g and the second carbon-based active material has a BET specific surface area of 0.9 m$^2$/g to 3.5 m$^2$/g. The BET specific surface area is measured according to a BET method (nitrogen adsorption method) described in JIS R1626.

With respect to the optimum combination of the tap densities and the BET specific surface areas of the first carbon-based active material and the second carbon-based active material, when the first carbon-based active material has a tap density of 0.86 g/cm$^3$ to 0.89 g/cm$^3$ and a BET specific surface area of 3.9 m$^2$/g to 6.8 m$^2$/g, the second carbon-based active material has a tap density of 1.03 g/cm$^3$ to 1.08 g/cm$^3$ and a BET specific surface area of 2.8 m$^2$/g to 3.1 m$^2$/g in terms of improving the input characteristics, the cyclic characteristics, and the high-temperature storage characteristics of a battery.

The first and the second carbon-based active materials are generally secondary particles in which a large number of primary particles aggregate. The average particle diameters of the first and the second carbon-based active materials (secondary particles) each are not particularly limited, and are, for example, 1 μm to 30 μm. The average particle diameters of the first and the second carbon-based active materials each mean a volume average particle diameter ($D_v50$) at which an integrated volume value reaches 50% in a particle size distribution measured by a laser diffraction scattering method.

For example, graphite, amorphous carbon, or the like is used as the first and the second carbon-based active materials. Among others, graphite is preferable. Examples of the graphite include: natural graphite, such as scale-like graphite; and artificial graphite, such as lump artificial graphite and graphitized mesophase carbon microbeads. The first and the second carbon-based active materials may also be covered graphite particles or the likes such that the surfaces of graphite particles are each covered with a covering layer including amorphous carbon. One of graphite and the like may be used singly, or two or more graphite and the like may be combined as the first and the second carbon-based active materials.

The second carbon-based active material preferably includes covered graphite particles such that the surfaces of graphite particles are each covered with a covering layer including amorphous carbon. When the covered graphite particles are included in the second carbon-based active material, the input characteristics of a battery are thereby improved in some cases. The covered graphite particles are obtained by, for example, mixing graphite powders to be cores and pitch as a carbon precursor that covers the surfaces of these cores to be amorphous carbon, and firing the resultant mixture in a nitrogen gas atmosphere.

In the first layer 32, the Si-based active material, and polyacrylic acid (PAA) or the salt thereof in addition to the first carbon-based active material are included. PAA or the salt thereof binds particles of the negative electrode active materials (the Si-based active material and the first carbon-based active material) strongly and therefore suppresses an increase in the negative electrode active material particles which are isolated from the conductive paths in the first layer 32, even when the volume of the Si-based active material is greatly changed accompanying charge and discharge. Therefore, by adding PAA or the salt thereof to the first layer 32, deterioration in cyclic characteristics is suppressed.

The Si-based active material is at least one of Si and a Si-containing compound, but is preferably a Si-containing compound exhibiting a smaller change in volume during charge and discharge than Si. The Si-containing compound is not particularly limited as long as it is a compound containing Si, but is preferably a compound represented by $SiO_x$ ($0.5 \leq x \leq 1.5$). The Si-containing compound may be used singly, or two or more of the Si-containing compounds may be combined. A conductive coating formed of a material having higher electrical conductivity than the Si-containing compound is preferably formed on the surfaces of the particles of the Si-containing compound. The average particle diameter ($D_v50$) of the Si-containing compound is, for example, 1 μm to 15 μm.

$SiO_x$ has a structure in which, for example, Si is dispersed in amorphous $SiO_2$ matrices. $SiO_x$ may include lithium silicate (for example, lithium silicate represented by $Li_{2z}SiO_{(2+z)}$ ($0<z<2$)) in the particles, and may have a structure in which Si is dispersed in lithium silicate phases.

The conductive coating is preferably a carbon coating. The carbon coating is formed in an amount of, for example, 0.5% by mass to 10% by mass based on the mass of the $SiO_x$ particles. Examples of a method for forming the carbon coating include a method of mixing coal tar or the like with Si-containing compound particles and subjecting the resultant mixture to a heat treatment, and a chemical vaper deposition method (CVD method) using a hydrocarbon gas or the like. In addition, the carbon coating may be formed by fixing carbon black, Ketjenblack, or the like firmly to the surfaces of the Si-containing compound particles using a binder.

The mass ratio of the first carbon-based active material to the Si-based active material included in the first layer 32 is, for example, 95:5 to 70:30, and preferably 95:5 to 80:20. When the mass ratio is within the range, the change in volume of the Si-based active material can be reduced by the first carbon-based active material while the capacity of a battery is enhanced, thereby making it easy to suppress the deterioration in the cyclic characteristics. In the first layer 32, the proportion of the Si-based active material in the negative electrode active material is preferably 5% by mass to 20% by mass, and more preferably 5% by mass to 15% by mass.

PAA or the salt thereof included in the first layer 32 functions as a binder. The salt of PAA is, for example, a lithium salt, a sodium salt, a potassium salt, or an ammonium salt. The first layer 32 preferably includes a second binder in addition to PAA and the salt thereof. Examples of the second binder include CMC or a salt thereof, a styrene-butadiene copolymer (SBR), polyvinyl alcohol (PVA), and PEO. Among others, CMC or the salt thereof, and SBR are preferable. The first layer 32 includes, for example, PAA or a salt thereof, CMC or a salt thereof, and SBR as the binder.

In the second layer 33, a binder is preferably included in addition to the second carbon-based active material. Examples of the binder included in the second layer 33 include CMC or a salt thereof, SBR, PVA, and PEO. Among others, CMC or the salt thereof, and SBR are preferable. In the second layer 33, the content ratio of PAA or the salt thereof is preferably lower than that in the first layer 32, and more preferably, PAA or the salt thereof is not contained substantially (for example, less than 0.1% by mass based on the mass of the binder included in the second layer 33) in terms of the input characteristics of a battery. That is, PAA or the salt thereof is more preferably included only in the first layer 32. The second layer 33 includes, for example, CMC or the salt thereof, and SBR as the binder.

The content of the binder included in the first layer 32 is preferably higher than the content of the binder included in the second layer 33. In this case, it is easy to improve the input characteristics while the deterioration in the cyclic characteristics of a battery is suppressed. The content of the binder included in the first layer 32 is, for example, preferably 0.5% by mass to 10% by mass, and more preferably 1% by mass to 5% by mass based on the mass of the first layer 32. The content of PAA or the salt thereof is preferably 20% by mass or more and is, for example, 20% by mass to 50% by mass based on the binder in the first layer 32 from the viewpoint of suppression of the deterioration in the cyclic characteristics, and the like. The content of the binder included in the second layer 33 is, for example, preferably 0.5% by mass to 10% by mass, and more preferably 1% by mass to 5% by mass based on the mass of the second layer 33.

In the first layer 32, fibrous carbon may be included. It is considered that when the fibrous carbon is included in the first layer 32, satisfactory conductive paths are thereby formed in the first layer 32 to contribute to an improvement in, for example, the cyclic characteristics. The fibrous carbon is, for example, a carbon material having an aspect ratio of 60 or more and has a size with which the carbon material can be added to the first layer 32. The fibrous carbon may also be included in the second layer 33, but the content ratio of the fibrous carbon is preferably lower than that in the first layer 32. The fibrous carbon is more preferably included only in the first layer 32. That is, more preferably, the fibrous carbon is not included substantially in the second layer 33 (for example, less than 0.001% by mass based on the mass of the second layer 33).

Examples of the fibrous carbon include a carbon nanotube (CNT) and a carbon nanofiber. CNT may be not only single-layered CNT but also double-layered CNT and multi-layered CNT, and a mixture thereof. CNT may also be a vapor-grown carbon fiber called VGCF (R). The fibrous carbon has, for example, a diameter of 2 nm to 20 μm and a total length of 0.03 μm to 500 μm. The content of the fibrous carbon is, for example, preferably 0.01% by mass to 5% by mass, and more preferably 0.5% by mass to 3% by mass based on the mass of the first layer 32.

The negative electrode 20 is produced by, for example, the following method. A first negative electrode mixture slurry for the first layer 32, the slurry including: the first carbon-based active material; the Si-based active material; the binder including PAA or the salt thereof; and the like, is prepared. A second negative electrode mixture slurry for the second layer 33, the slurry including: the second carbon-based active material; the binder; and the like, is prepared. The first negative electrode mixture slurry is applied on the negative electrode current collector 30, and the resultant coating film is dried to form the first layer 32 on the negative electrode current collector 30. Subsequently, the second negative electrode mixture slurry is applied on the first layer 32, the resultant coating film is dried to form the second layer 33 on the first layer 32, and the first layer 32 and the second layer 33 are then compressed. In this manner, the negative electrode 20 such that the negative electrode mixture layer 31 including the first layer 32 and the second layer 33 is formed on the negative electrode current collector 30 is obtained.

[Separator]

An ion-permeable and insulating porous sheet is used as the separator. Specific examples of the porous sheet include a microporous thin film, a woven fabric, and a nonwoven fabric. As the material for the separator, an olefin-based resin such as polyethylene, polypropylene, or a copolymer including at least one of ethylene and propylene, cellulose, or the like is suitable. A separator may have a single-layered structure or a laminated structure. A heat resistant layer or the like may be formed on the surface of the separator.

[Non-Aqueous Electrolyte]

The non-aqueous electrolyte includes: a non-aqueous solvent; and an electrolyte salt dissolved in the non-aqueous solvent. The non-aqueous electrolyte is not limited to a liquid electrolyte (non-aqueous electrolytic solution) and may be a solid electrolyte using a gel polymer or the like. As the electrolyte salt, for example, a lithium salt such as $LiBF_4$ or $LiPF_6$, is used. As the non-aqueous solvent, for example, an ester such as ethylene carbonate (EC), propylene carbonate (PC), dimethyl carbonate (DMC), ethyl methyl carbonate (EMC), diethyl carbonate (DEC), or methyl propionate (MP), an ether, a nitrile, an amide, and a mixed solvent of two or more thereof are used. The non-aqueous solvent may contain a halogen-substituted product formed by replacing at least some of the hydrogen atoms of any of the above solvents with a halogen atom such as fluorine.

Examples of the halogen-substituted product include a fluorinated cyclic carbonate ester such as fluoroethylene carbonate (FEC), a fluorinated chain carbonate ester, and a fluorinated chain carboxylate ester such as methyl fluoropropionate (FMP).

EXAMPLES

Hereinafter, the present disclosure will further be described with Examples, but the present disclosure is not limited to these Examples.

Experimental Example 1

[Positive Electrode]

A lithium transition metal oxide represented by $LiN_{1/3}Co_{1/3}Mn_{1/3}O_2$ was used as a positive electrode active material. A positive electrode mixture shiny was prepared by mixing 94.8 parts by mass of the positive electrode active material, 4 parts by mass of acetylene black, and 1.2 parts by mass of PVDF, and, further, adding an appropriate amount of N-methyl-2-pyrrolidone (NMP). Next, the positive electrode mixture slurry was applied on a positive electrode current collector excluding a part where a lead was to be connected, the positive electrode current collector formed of an aluminum foil, and the resultant coating film was dried. The coating film was rolled using a roller, and then cut into a predetermined electrode size to produce a positive electrode having a positive electrode mixture layer formed on each side of the positive electrode current collector.

[Negative Electrode]

Graphite A having a tap density of 0.89 g/cm$^3$ and a BET specific surface area of 6.3 m$^2$/g was used as the first carbon-based active material constituting the first layer (lower layer). A first negative electrode mixture slurry for the first layer was prepared by mixing graphite A, $SiO_x$ (x=0.94) having a carbon coating, a lithium salt of PAA, a sodium salt of CMC, and a dispersion of SBR in a mass ratio of solid contents of 88/9/1/1/1, and adding an appropriate amount of water. In addition, graphite B having a tap density of 1.08 g/cm$^3$ and a BET specific surface area of 2.8 m$^2$/g was used as the second carbon-based active material constituting the second layer (upper layer). A second negative electrode mixture slurry for the second layer was prepared by mixing graphite B, a sodium salt of CMC, and a dispersion of SBR in a mass ratio of solid contents of 98/1/1, and adding an appropriate amount of water.

Next, the first negative electrode mixture slurry was applied on each side of a negative electrode current collector excluding a part where a lead was to be connected, the negative electrode current collector formed of a copper foil, and the resultant coating film was dried to form the first layer on each side of the negative electrode current collector. Subsequently, the second negative electrode mixture slurry was applied on the first layer formed on each side of the negative electrode current collector, and the resultant coating film was dried to form the second layer. The coating film was rolled using a roller, and was then cut into a predetermined electrode size to produce a negative electrode having a negative electrode mixture layer formed on each side of the negative electrode current collector, the negative electrode mixture layer including the first layer and the second layer.

The masses of the first layer and the second layer in the negative electrode mixture layer were measured to find that the mass ratio of the second layer/the first layer was 0.5. In addition, the filling density of the negative electrode mixture layer was 1.65 g/cm$^3$.

[Non-Aqueous Electrolyte]

To a mixed solvent obtained by mixing ethylene carbonate (EC), fluorinated ethylene carbonate (FEC), and diethyl carbonate (DEC) in a volume ratio of 27:3:70, 1% by mass of vinylene carbonate (VC) was added, and $LiPF_6$ was dissolved in a proportion of 1.2 mol/L in the resultant solution to prepare a non-aqueous electrolyte.

[Test Cell]

A lead was attached to each of the negative electrode and the positive electrode, and a lamination type electrode assembly in which the respective electrodes are alternately laminated one by one with separators interposed therebetween was produced. A single-layered polypropylene separator was used as the separator. The produced electrode assembly was inserted in an exterior body formed of an aluminum laminate sheet and was vacuum-dried at 105° C. for 2 hours and 30 minutes, the non-aqueous electrolyte was then injected therein, and an opening of the exterior body was sealed to produce a test cell (lamninate cell). The design capacity of the test cell is 640 mAh.

Experimental Example 2

A test cell was produced in the same manner as in Experimental Example 1, except that graphite C having a tap density of 0.88 g/cm$^3$ and a BET specific surface area of 4.3 m$^2$/g was used in the preparation of the first negative electrode mixture slurry and that graphite D having a tap density of 1.06 g/cm³ and a BET specific surface area of 4.4 m²/g was used in the preparation of the second negative electrode mixture slurry.

Experimental Example 3

A test cell was produced in the same manner as in Experimental Example 1, except that graphite D having a tap density of 1.06 g/cm³ and a BET specific surface area of 4.4 m²/g was used in the preparation of the second negative electrode mixture slurry.

[Evaluation of 100 Cycle Capacity Retention Ratio]

In a temperature environment of 25° C., the test cells were charged at a constant current of 0.5 It until the battery voltage reached to 4.3 V, and then carried out at a constant voltage of 4.3 V until the current reached to 1/50 It. Thereafter, the test cell was constant-current discharged at a constant current of 0.5 It until the battery voltage reached to 3.0 V. This charging/discharging was carried out 100 cycles to determine the capacity retention ratio in the charging/discharging cycles based on the following equation.

Capacity retention ratio=(discharge capacity in 100th cycle/discharge capacity in first cycle)×100

[Evaluation of Input Characteristics]

In temperature environments of 25° C., the test cell was charged at a constant current of 0.5 It until reaching a half of the initial capacity, and the charging was then stopped to leave the test cell to stand for 15 minutes. The voltage after charging at a current of 0.1 It for 10 seconds was measured. Discharging by an amount corresponding to the capacity charged for 10 seconds, measuring the voltage after charging at the next current for 10 seconds, and discharging by an amount corresponding to the capacity charged for 10 seconds were repeated from a current of 0.1 It to 2 It. The electric power (input characteristic) that is necessary for allowing a battery voltage to reach 4.3 V by charging for 10 seconds was determined by calculating a current at which the battery voltage reaches 4.3 V by charging for 10 seconds from the respective measured voltages. Each of the input characteristics shown in Table 1 is a relative value obtained using the necessary electric power of the test cell of Experimental Example 2 as a standard (100). A value higher than 100 shows that the test cell is superior to the test cell of Experimental Example 2 in the input characteristic.

[Evaluation of High-Temperature Storage Characteristics]

In a temperature environment of 25° C., the test cell was charged at a constant current of 0.5 It until the battery voltage reached to 4.3 V, and then at a constant voltage of 4.3 V until the current reached to 1/50 It. Thereafter, the test cell was constant-current discharged at a constant current of 0.5 It until the battery voltage reached to 2.5 V (i). Next, in a temperature environment of 25° C., the test cell was charged at a constant current of 0.5 It until the battery voltage reached to 4.3 V, and then at a constant voltage of 4.3 V until the current reached to 1/50 It. A storage test in a temperature environment of 60° C. for 20 days was carried out in the charged state. Thereafter, the test cell was constant-current discharged at a constant current of 0.5 It until the battery voltage reached to 2.5 V (ii). Next, in a temperature environment of 25° C., the test cell was charged at a constant current of 0.5 It until the battery voltage reached to 4.3 V, and then at a constant voltage of 4.3 V until the current reached to 1/50 It. Thereafter, the test cell was constant-current discharged at a constant current of 0.5 It until the battery voltage reached to 2.5 V (iii). The residual capacity and the recovery capacity were determined based on the following equations.

Residual capacity=(discharge capacity in (ii)/discharge capacity in (i))×100

Recovery capacity=(discharge capacity in (iii)/discharge capacity in (i))×100

The capacity recovery ratio after the high-temperature storage was determined based on the following equation. When the value of the capacity recovery ratio after the high-temperature storage is higher, it indicates that the storage characteristics are more excellent.

Capacity recovery ratio after high-temperature storage=(residual capacity/recovery capacity)×100

Table 1 shows the structure of the negative electrode, and the surface area (BET specific surface area) and the tap density of graphite in Experimental Examples 1 to 3, and Table 2 shows the evaluation results (100 cycle capacity retention ratio, input characteristics, and capacity recovery ratio after high-temperature storage) for the test cells of Experimental Examples 1 to 3.

TABLE 1

| | Negative electrode mixture layer | First layer Surface area of graphite (m²/g) | Second layer Surface area of graphite (m²/g) | First layer Tap density of graphite (g/cm³) | Second layer Tap density of graphite (g/cm³) |
|---|---|---|---|---|---|
| Experimental example 1 | Second layer: Graphite B/CMC/SBR First layer: Graphite A/SiO/PAA/CMC/SBR | 6.3 | 2.8 | 0.89 | 1.08 |
| Experimental example 2 | Second layer: Graphite D/CMC/SBR First layer: Graphite C/SiO/PAA/CMC/SBR | 4.3 | 4.4 | 0.88 | 1.06 |
| Experimental example 3 | Second layer: Graphite D/CMC/SBR First layer: Graphite A/SiO/PAA/CMC/SBR | 6.3 | 4.4 | 0.89 | 1.06 |

TABLE 2

| | 100 Cycle capacity retention ratio | Input characteristics | Capacity recovery-ratio after high-temperature storage |
|---|---|---|---|
| Experimental example 1 | 87.0% | 106 | 88.4% |
| Experimental example 2 | 86.2% | 100 | 86.3% |
| Experimental example 3 | 86.3% | 106 | 86.5% |

As can be seen from Table 1, the test cell of Experimental Example 1 is superior to the test cell of Experimental Example 2 in the cyclic characteristics, the input characteristics, and the high-temperature storage characteristics. The test cell of Experimental Example 1 was equivalent to the test cell of Experimental Example 3 in the input characteristics, but is superior to the test cell of Experimental Example 3 in the cyclic characteristics and the high-temperature storage characteristics.

REFERENCE SIGNS LIST 10 non-aqueous electrolyte secondary battery, 11 electrode assembly, 12 positive electrode terminal, 13 negative electrode terminal, 14 battery case, 15 case body, 16 sealing assembly, 17 insulating member, 20 negative electrode, 30 negative electrode current collector, 31 negative electrode mixture layer, 32 first layer, 33 second layer

The invention claimed is:

1. A negative electrode for a non-aqueous electrolyte secondary battery, comprising:
a negative electrode current collector; and
a negative electrode mixture layer formed on the negative electrode current collector,
wherein the negative electrode mixture layer has:
a first layer formed on the negative electrode current collector, the first layer including a first carbon-based active material, a Si-based active material, and polyacrylic acid or a salt thereof; and
a second layer formed on the first layer, the second layer including a second carbon-based active material having a higher tap density than the first carbon-based active material and a lower BET specific surface area than the first carbon-based active material,
the mass of the first layer is 50% by mass or more and less than 90% by mass based on the mass of the negative electrode mixture layer, and the mass of the second layer is more than 10% by mass and 50% by mass or less based on the mass of the negative electrode mixture layer, and
the first layer has a filling density of 1.65 g/cm$^3$ to 1.90 g/cm$^3$, and the second layer has a filling density of 1.40 g/cm$^3$ to 1.55 g/cm$^3$.

2. The negative electrode for a non-aqueous electrolyte secondary battery according to claim 1, wherein the first carbon-based active material has a BET specific surface area of 3.0 m$^2$/g to 8.0 m$^2$/g, and the second carbon-based active material has a BET specific surface area of 0.9 m$^2$/g to 4.0 m$^2$/g.

3. The negative electrode for a non-aqueous electrolyte secondary battery according to claim 1, wherein the first carbon-based active material has a BET specific surface area of 3.5 m$^2$/g to 6.5 m$^2$/g, and the second carbon-based active material has a BET specific surface area of 0.9 m$^2$/g to 3.5 m$^2$/g.

4. The negative electrode for a non-aqueous electrolyte secondary battery according to claim 1, wherein the negative electrode mixture layer has a filling density of 1.60 g/cm$^3$ or more.

5. A non-aqueous electrolyte secondary battery, comprising:
the negative electrode for a non-aqueous electrolyte secondary battery according to claim 1;
a positive electrode; and
a non-aqueous electrolyte.

* * * * *